(12) United States Patent
Allin et al.

(10) Patent No.: US 10,656,690 B2
(45) Date of Patent: *May 19, 2020

(54) SYSTEM FOR DISCHARGING HEAT OUT OF HEAD-MOUNTED DISPLAY BASED ON HYBRID FAN AND HEAT PIPE

(71) Applicant: Facebook Technologies, LLC, Menlo Park, CA (US)

(72) Inventors: Boyd Drew Allin, Seattle, WA (US); Robin Michael Miller, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,519

(22) Filed: Jun. 27, 2019

(65) Prior Publication Data

US 2019/0317573 A1 Oct. 17, 2019

Related U.S. Application Data

(63) Continuation of application No. 15/491,522, filed on Apr. 19, 2017, now Pat. No. 10,379,583.

(51) Int. Cl.
*G06F 1/20* (2006.01)
*G06F 1/16* (2006.01)
*G06F 3/01* (2006.01)

(52) U.S. Cl.
CPC .............. *G06F 1/203* (2013.01); *G06F 1/163* (2013.01); *G06F 1/20* (2013.01); *G06F 3/011* (2013.01)

(58) Field of Classification Search
CPC .............. G06F 1/203; G06F 1/20; G06F 1/163
See application file for complete search history.

(56) References Cited

U.S. PATENT DOCUMENTS

| 6,366,460 B1 * | 4/2002 | Stone ...................... G06F 1/203 361/679.47 |
| 7,589,972 B2 | 9/2009 | Ma et al. |

(Continued)

FOREIGN PATENT DOCUMENTS

| CN | 106163241 A | 11/2016 |
| CN | 205958846 U * | 2/2017 |

(Continued)

OTHER PUBLICATIONS

PCT International Search Report and Written Opinion, PCT Application No. PCT/US2017/030630, dated Jan. 10, 2018, 16 pages.

(Continued)

*Primary Examiner* — Nidhi Thaker
(74) *Attorney, Agent, or Firm* — Fenwick & West LLP

(57) ABSTRACT

A head-mounted display (HMD) includes a hybrid fan, a printed circuit board (PCB) with one or more electronic components and a heat pipe to dissipate heat. The hybrid fan has a center axis extending from a rear side of the HMD to a front side of the HMD. The hybrid fan pulls air from a rear side of the HMD. The heat pipe has an end coupled to the PCB. The heat pipe partially surrounds a periphery of the hybrid fan and transfers heat away from at least the PCB. The HMD further includes a side cover and a front cover. The side cover encloses the hybrid fan, the PCB and the heat pipe. The front cover is attached to the side cover with a slit between an outer edge of the front cover and an outer edge of the side cover to discharge air from the hybrid fan.

20 Claims, 5 Drawing Sheets

(56) References Cited

U.S. PATENT DOCUMENTS

| | | | |
|---|---|---|---|
| D609,198 S | 2/2010 | Hsu et al. | |
| 7,965,512 B2 | 6/2011 | Huang et al. | |
| D708,592 S | 7/2014 | Andre et al. | |
| 9,423,842 B2* | 8/2016 | Osterhout | G06F 1/206 |
| 9,585,285 B2* | 2/2017 | Nikkhoo | H05K 7/20127 |
| D785,578 S | 5/2017 | Kim et al. | |
| 2008/0105410 A1 | 5/2008 | Hwang et al. | |
| 2011/0186269 A1 | 8/2011 | Yang et al. | |
| 2013/0070418 A1 | 3/2013 | Lee et al. | |
| 2013/0070419 A1 | 3/2013 | Yang et al. | |
| 2013/0077242 A1 | 3/2013 | Hsiao | |
| 2013/0077251 A1 | 3/2013 | Yang et al. | |
| 2014/0102670 A1 | 4/2014 | Tu | |
| 2014/0182818 A1 | 7/2014 | Wang et al. | |
| 2014/0290908 A1 | 10/2014 | Wang | |
| 2015/0124403 A1 | 5/2015 | Lee et al. | |
| 2015/0192369 A1 | 7/2015 | Rivera et al. | |
| 2015/0330716 A1 | 11/2015 | Chen | |
| 2016/0004085 A1 | 1/2016 | Stroetmann | |
| 2016/0131442 A1 | 5/2016 | Huang | |
| 2016/0255748 A1* | 9/2016 | Kim | H05K 7/20972 361/695 |
| 2016/0377328 A1 | 12/2016 | Hurbi | |
| 2017/0153862 A1* | 6/2017 | Serota | G06F 3/1446 |
| 2017/0184863 A1* | 6/2017 | Balachandreswaran | G02B 27/0176 |

FOREIGN PATENT DOCUMENTS

| | | |
|---|---|---|
| CN | 205958846 U | 2/2017 |
| CN | 206096637 U | 4/2017 |
| EP | 3070511 A2 | 9/2016 |
| WO | WO 2016/118306 A1 | 7/2016 |

OTHER PUBLICATIONS

European Extended Search Report, European Application No. 17196418. 2, dated Apr. 26, 2018, 7 pages.
EBay, "New Genuine Toshiba CPU Heatsink C670 C675 C675D Series", first sold on Jul. 1, 2017. 4 pages. (https://www.ebay.com/itm/H000026370-13NO-Y3AOW02-N EW-GENU in E-TOSH IBA-CPU-HEATSI NK-C670-C675-C675D-SERIES/142315100462).
EBay, "HP EliteBook 11.6" 2170p Genuine Laptop CPU Cooling Heatsink 693307-001 GLP*"", Accessed Jun. 4, 2018. 3 pages. (https://www.ebay.com/itm/H P-EliteBook-11-6-2170p-Genuine-Laptop-CPU-Cooling-Heatsink-693307-001-GLP/282691921487).

* cited by examiner

SYSTEM FOR DISCHARGING HEAT OUT OF HEAD-MOUNTED DISPLAY BASED ON HYBRID FAN AND HEAT PIPE

CROSS REFERENCE TO RELATED APPLICATIONS

This application is a continuation of co-pending U.S. application Ser. No. 15/491,522, filed Apr. 19, 2017, which is incorporated by reference in its entirety.

BACKGROUND

The present disclosure generally relates to a system for dissipating heat generated in a head-mounted display (HMD), and specifically relates to a system for discharging heat out of the HMD based on a hybrid fan and a heat pipe.

The HMD can operate as part of, e.g., a virtual reality (VR) system, an augmented reality (AR) system, a mixed reality (MR) system, or some combination thereof. During operations of the HMD, heat is generated inside the HMD. The heat in the HMD may be generated by one or more electronic components of the HMD, by a face of a user wearing the HMD, etc. For proper operations of the HMD, the heat generated inside the HMD needs to be efficiently discharged out of the HMD.

SUMMARY

Embodiments of the present disclosure relate to a head-mounted display (HMD) that comprises a hybrid fan, a printed circuit board (PCB) with one or more electronic components and a heat pipe. The hybrid fan has a center axis extending from a rear side of the HMD to a front side of the HMD. The hybrid fan is configured to pull air from a rear side of the HMD. The heat pipe has an end coupled to the PCB. The heat pipe at least partially surrounds a periphery of the hybrid fan and transfers heat away from at least the PCB. The HMD further includes a side cover and a front cover. The side cover encloses the hybrid fan, the PCB and the heat pipe. The front cover is attached to the side cover with a slit between an outer edge of the front cover and an outer edge of the side cover to discharge air from the hybrid fan.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure relate to a head-mounted display (HMD) with thermal exhaust design that includes a hybrid fan and a heat pipe. The hybrid fan discharges heat through a front side of the HMD. A printed circuit board (PCB) including a central processing unit (CPU) may be placed below a top surface of the HMD and connected to the heat pipe to transfer heat away from the CPU effectively. The HMD also includes a metal frame that acts as a heat sink in addition to providing structural support.

Figure 1:
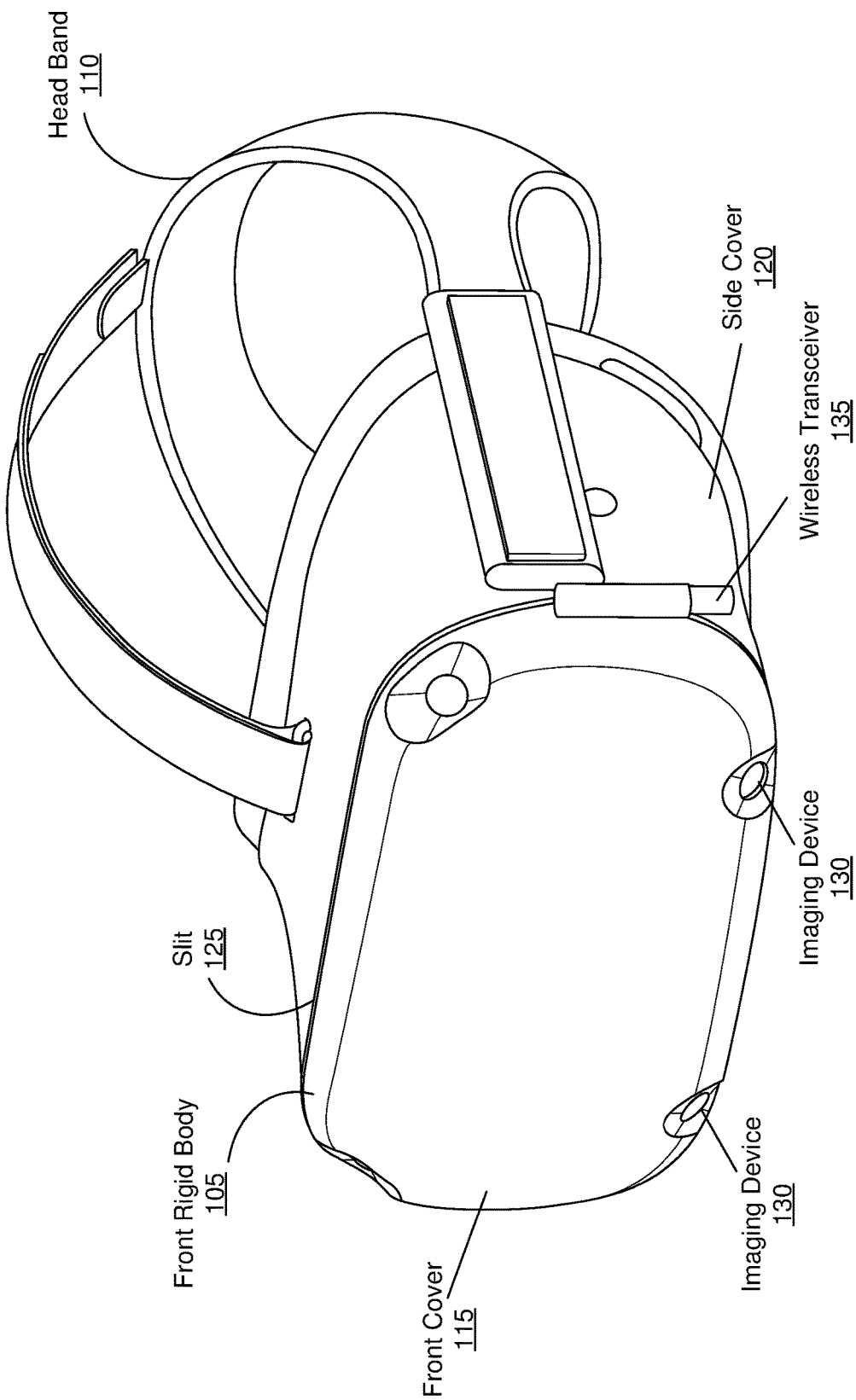
FIG. 1 is a perspective view of a head-mounted display (HMD), in accordance with an embodiment.

FIG. 1 is a perspective view of HMD 100, in accordance with an embodiment. The HMD 100 may be part of a virtual reality (VR) system. The HMD 100 may include, among other components, a front rigid body 105, a head band 110, a front cover 115, and a side cover 120. The side cover 120 encloses components for discharging heat generated inside the HMD 100, as discussed in detail in conjunction with FIGS. 2A-2B, FIG. 3 and FIG. 4. The front cover 115 is attached to the side cover 120 with a slit 125 between an outer edge of the front cover 115 and an outer edge of the side cover 120 to discharge air and heat out of the HMD 100.

The HMD 100 shown in FIG. 1 also includes camera assemblies 130 located on top and bottom portions of the front cover 115. In some embodiments, each camera assembly 130 can be implemented as a depth camera assembly (DCA) that determines depth information of a local area surrounding some or all of the HMD 100. Each camera assembly 130 includes an imaging aperture and an illumination aperture (not shown in FIG. 1), and an illumination source (not shown in FIG. 1) of the camera assembly 130 emits light through the illumination aperture. The illumination source of the camera assembly 130 may be composed of a plurality of laser-type light emitters on a single substrate that simultaneously or in different time instants emit a plurality of light beams, e.g., in the form of a structured light pattern. An imaging device (not shown in FIG. 1) of the camera assembly 130 captures light from the illumination source that is reflected and/or scattered from the local area through the imaging aperture. A controller (not shown in FIG. 1) coupled to the imaging device or integrated within the imaging device of the camera assembly 130 may determine two-dimensional or three-dimensional information of one or more objects in the local area based on the captured reflected/scattered light. The same or a separate controller can control operation of the illumination source of the camera assembly 130.

The HMD 100 shown in FIG. 1 also includes a wireless transceiver 135. In some embodiments, the HMD 100 wirelessly communicates with a console (not shown in FIG. 1) via the wireless transceiver 135. The console may provide content to the HMD 100 for processing in accordance with information received from the HMD 100. The HMD 100 may transmit the information to the console via the wireless transceiver 135. The HMD may further receive the content from the console via the wireless transceiver 135. In some embodiments, the console generates a two-dimensional and/or three-dimensional mapping of the local area surrounding some or all of the HMD 100 based on information received from the HMD 100. In some embodiments, the console determines depth information for the three-dimensional mapping of the local area based on information received from the camera assembly 130 that is relevant for techniques used in computing depth. The HMD 100 may provide to the console, e.g., via the wireless transceiver 135, position information, acceleration information, velocity information, predicted future positions, or some combination thereof, of the HMD 100. Based on the received information, the console determines content to provide to the HMD 100 for presentation to the user.

In one embodiment, the front rigid body 105 includes one or more electronic display elements (not shown in FIG. 1), one or more integrated eye tracking systems (e.g., one eye tracking system for each eye of a user wearing the HMD 100, not shown in FIG. 1) that estimate a position and angular orientation of the user's eyes, an Inertial Measurement Unit (IMU) (not shown in FIG. 1), one or more position sensors (not shown in FIG. 1), and a reference point (not shown in FIG. 1). The position sensors may be located within the IMU, and neither the IMU nor the position sensors are visible to a user of the HMD 100. The IMU is an electronic device that generates fast calibration data based on measurement signals received from one or more of the position sensors. A position sensor generates one or more measurement signals in response to motion of the HMD 100. Examples of position sensors include: one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof.

The one or more electronic display elements of the HMD 100 may be integrated into an electronic display (not shown in FIG. 1). The electronic display generates image light. In some embodiments, the electronic display includes an optical element that adjusts the focus of the generated image light. The electronic display displays images to the user in accordance with data received from a console (not shown in FIG. 1). In various embodiments, the electronic display may comprise a single electronic display or multiple electronic displays (e.g., a display for each eye of a user). Examples of the electronic display include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display.

The HMD 100 may also include an optical assembly (not shown in FIG. 1). The optical assembly magnifies received light from the electronic display, corrects optical aberrations associated with the image light, and the corrected image light is presented to a user of the HMD 100. At least one optical element of the optical assembly may be an aperture, a Fresnel lens, a refractive lens, a reflective surface, a diffractive element, a waveguide, a filter, a reflective surface, a polarizing reflective surface, or any other suitable optical element that affects the image light emitted from the electronic display. Moreover, the optical assembly may include combinations of different optical elements. In some embodiments, one or more of the optical elements in the optical assembly may have one or more coatings, such as anti-reflective coatings, dichroic coatings, etc. Magnification of the image light by the optical assembly allows elements of the electronic display to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optical assembly is designed so its effective focal length is larger than the spacing to the electronic display, which magnifies the image light projected by the electronic display. Additionally, in some embodiments, the amount of magnification may be adjusted by adding or removing optical elements.

Figure 2A:
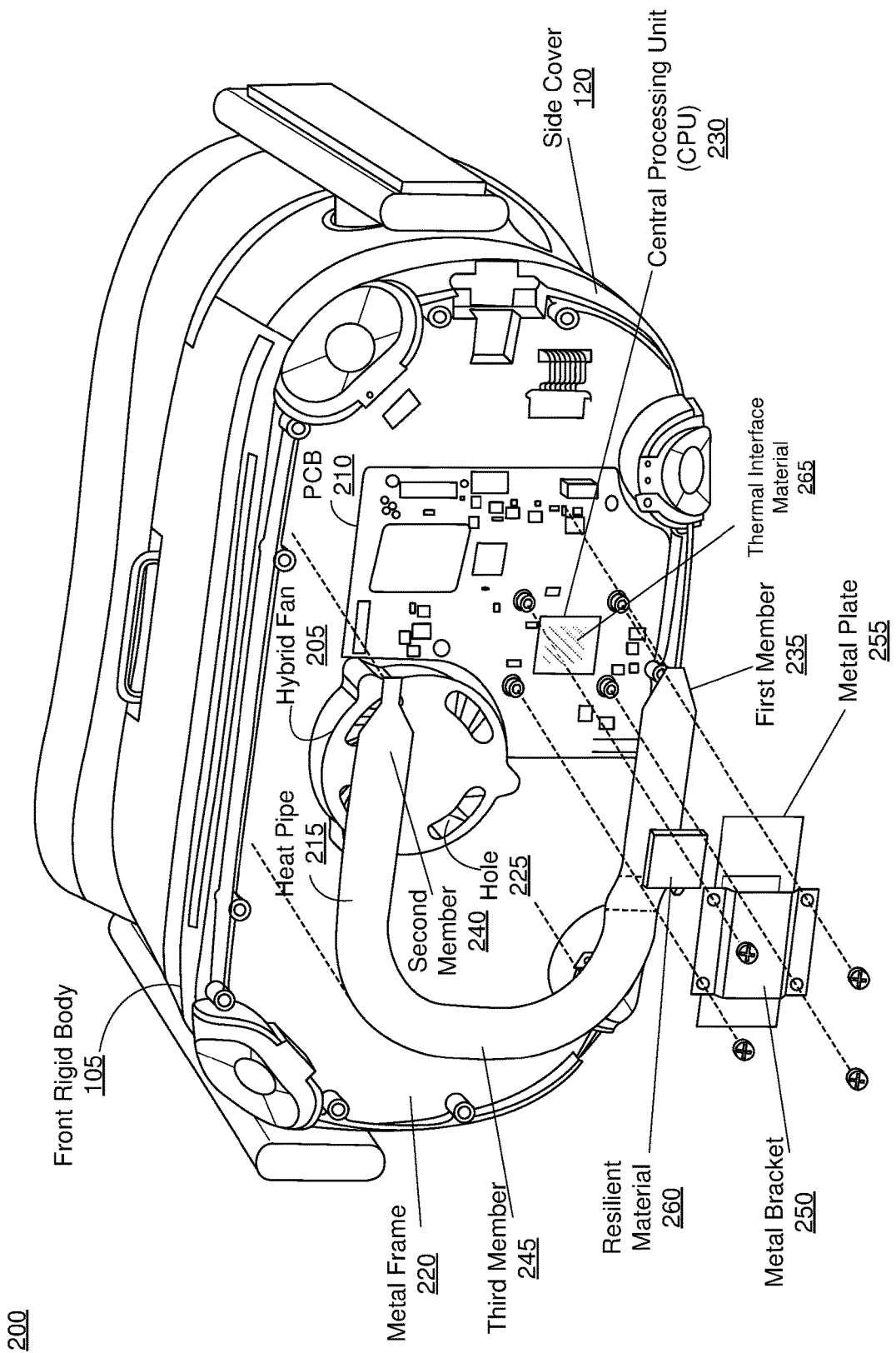
FIG. 2A is a perspective view of a front rigid body of the HMD in FIG. 1 without a front cover and showing components within the front rigid body, in accordance with an embodiment.

FIG. 2A is a perspective view 200 of the front rigid body 105 of the HMD 100 in FIG. 1 without the front cover 115, in accordance with an embodiment. The front cover 115 is removed in FIG. 2A so that different components placed within the front rigid body 105 can be illustrated. As shown in FIG. 2A, the front rigid body 105 includes a hybrid fan 205, a printed circuit board (PCB) 210 with one or more electronic components, and a heat pipe 215. The side cover 120 encloses the hybrid fan 205, the PCB 210 and the heat pipe 215. The front rigid body 105 further includes a metal frame 220 onto which the PCB 210 is mounted. The metal frame 220 acts as a heat sink in addition to providing structural support, as discussed in more detail in conjunction with FIG. 2B. The metal frame 220 is formed with a hole 225 to receive the hybrid fan 205, and the metal frame 220 is also enclosed within the side cover 120. The metal frame 220 has edges shaped with contours that match an internal contour of the side cover 120 to support the side cover 120. In an embodiment, the metal frame 220 is made of magnesium. In alternate embodiments, the metal frame 220 can be made of other metals or combination of metals.

The hybrid fan 205 has a center axis extending from a rear side of the front rigid body 105 to a front side of the front rigid body 105. The hybrid fan 205 pulls air from the rear side of the front rigid body 105 to the front side of the front rigid body 105. For example, the hybrid fan 205 pulls the air (e.g., warm and moist air) from a cavity between a face of a user wearing the HMD 100 and the front rigid body 105 to cool down temperature in the cavity. The hybrid fan 205 exhausts the air at sides of the axial fan 205 after pulling the air from the rear side of the front rigid body 105. In this way, the hybrid fan 205 discharges heat from the user's face or the facial cavity out of the HMD 100 and also cools electronic components of the PCB 210. More details about air flows for discharging heat out of the HMD 100 are disclosed in conjunction with FIG. 3. In some embodiments, the hybrid fan 205 pulls air from front slots on the hybrid fan 205. The air pulled from the front slots are exhausted at sides of the hybrid fan 205 for cooling the electronic components of the PCB 210. In some embodiments, various types of fans other than the hybrid fan 205 can be utilized for discharging heat out of the HMD 100 and for cooling the electronic components of the PCB 210.

The PCB 210 is mounted on the metal frame 220. The PCB 210 includes one or more electronic components that perform different operations in the HMD 100. In some embodiments, the PCB 210 includes a central processing unit (CPU) 230 that performs computation operations in the HMD 100. The CPU 230 and other electronic components of the PCB 210 generate heat when performing the operations in the HMD 100. To reliable operate the HMD 100, the heat generated by the one or more electronic components of the PCB 210 is discharged out of the HMD 100 and a temperature of each electronic component is kept below a threshold level.

Figure 2B:
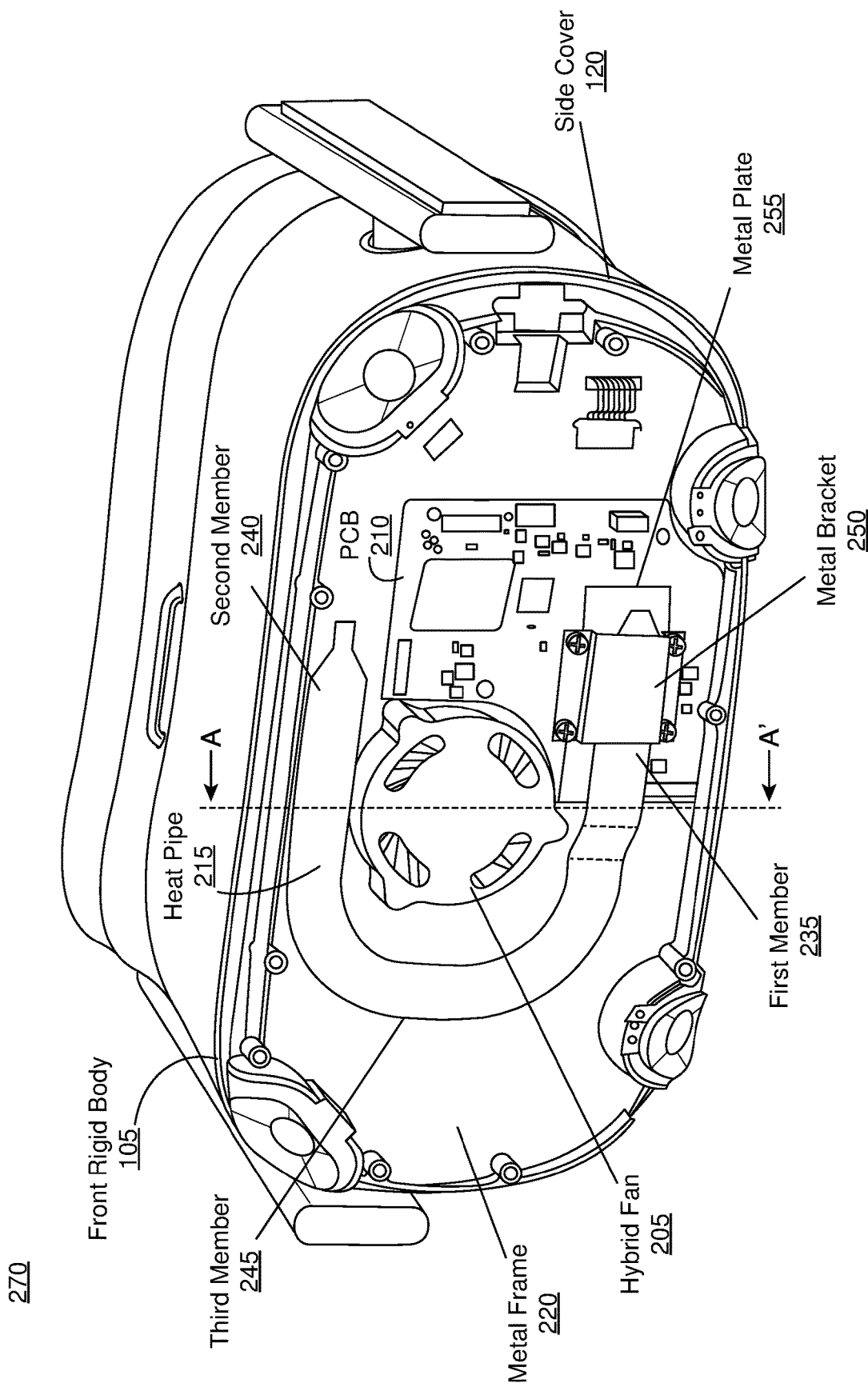
FIG. 2B is a perspective view of the front rigid body of the HMD in FIG. 1 without a front cover and showing a heat pipe coupled to a printed circuit board (PCB), in accordance with an embodiment.

For efficient transferring of heat away from the PCB 210, the heat pipe 215 is included in the front rigid body 105 of the HMD 100. The heat pipe 215 at least partially surrounds a periphery of the hybrid fan 205, as further shown in FIG. 2B. In one embodiment, as shown in FIGS. 2A-2B, the heat pipe 215 is designed as a horseshoe shaped object with a first member 235, a second member 240 extending parallel to the first member 235 and a third member 245 connecting the first member 235 and the second member 240. In an alternate embodiment (not shown in FIGS. 2A-2B), the third member is removed for weight and cost savings. In this case, the heat pipe 215 is composed of the first member 235 and the second member 240 extending parallel to the first member 235, wherein the first member 235 and the second member 240 are not connected. In some embodiments, one end of the heat pipe 215, e.g., an end of the first member 235, is coupled to the PCB 210.

The first member 235 of the heat pipe 215 is coupled to the PCB 210 via a metal bracket 250, a metal plate 255 and a resilient material 260 placed in an opening of the metal plate 255. As shown in FIG. 2B, the metal plate 255 is placed beneath the first member 235 of the heat pipe 215, and the metal plate 255 is directly coupled to the PCB 210. The metal bracket 250 is placed on top of the first member 235 of the heat pipe 215, thus securing the heat pipe 215 to the PCB 210. As shown in FIG. 2A, screws positioned in holes of the metal bracket 250 are placed on corresponding screw bosses protruding from portions of the PCB 210 around the CPU 230, thus attaching the metal bracket 250 and the heat pipe 215 to the PCB 210. The metal bracket 250 and the heat pipe 215 can be attached to the PCB 210 utilizing a mounting hardware different than that illustrated in FIG. 2A. In some embodiments, to facilitate transfer of heat from the CPU 230 to the heat pipe 215, a thermal interface material 265 is put on top of the CPU 230. Specifically, the end of the first member 235 of the heat pipe 215 is coupled to the CPU 230 via the thermal interface material 265. The thermal interface material 265 can be a thermal paste or a thermal grease. In alternate embodiments (not shown in FIG. 2A), the thermal interface that couples the end of the first member 235 of the heat pipe 215 to the CPU 230 is implemented as a phase change pad. Other components different from the components shown in FIG. 2A can be utilized for coupling the first member 235 of the heat pipe 215 to the PCB 210.

FIG. 2B is a perspective view 270 of the front rigid body 105 of the HMD 100 without the front cover 115, in accordance with an embodiment. The view 270 of FIG. 2B shows the heat pipe 215 coupled to the PCB 210 and mounted on the metal frame 220. The heat pipe 215 is secured to the PCB 210 by the metal bracket 250. As shown in FIG. 2B, one end of the first member 235 of the heat pipe 215 is placed between the metal bracket 250 and the metal plate 255. The metal plate 255 is directly coupled to the PCB 210 and the CPU 230 (not shown in FIG. 2B) via the thermal paste 265 (not shown in FIG. 2B).

The heat pipe 215 is connected to the metal frame 220 to transfer heat away from the one or more electronic components of the PCB 210 into the metal frame 220 that acts as a main heat sink. The metal frame 220 spreads the heat, thus facilitating discharging the heat out of the front rigid body 105, e.g., through the slit 125 formed between the outer edge of the front cover 115 and the outer edge of the side cover 120 of the front rigid body 105 shown in FIG. 1. As shown in FIG. 2B, the heat pipe 215 at least partially surrounds a periphery of the hybrid fan 205. In this way, the heat can be transferred away from the one or more electronic components of the PCB 210 including the CPU 230 more efficiently. More details about air flows for discharging heat out of the HMD 100 are disclosed in conjunction with FIG. 3.

Figure 3:
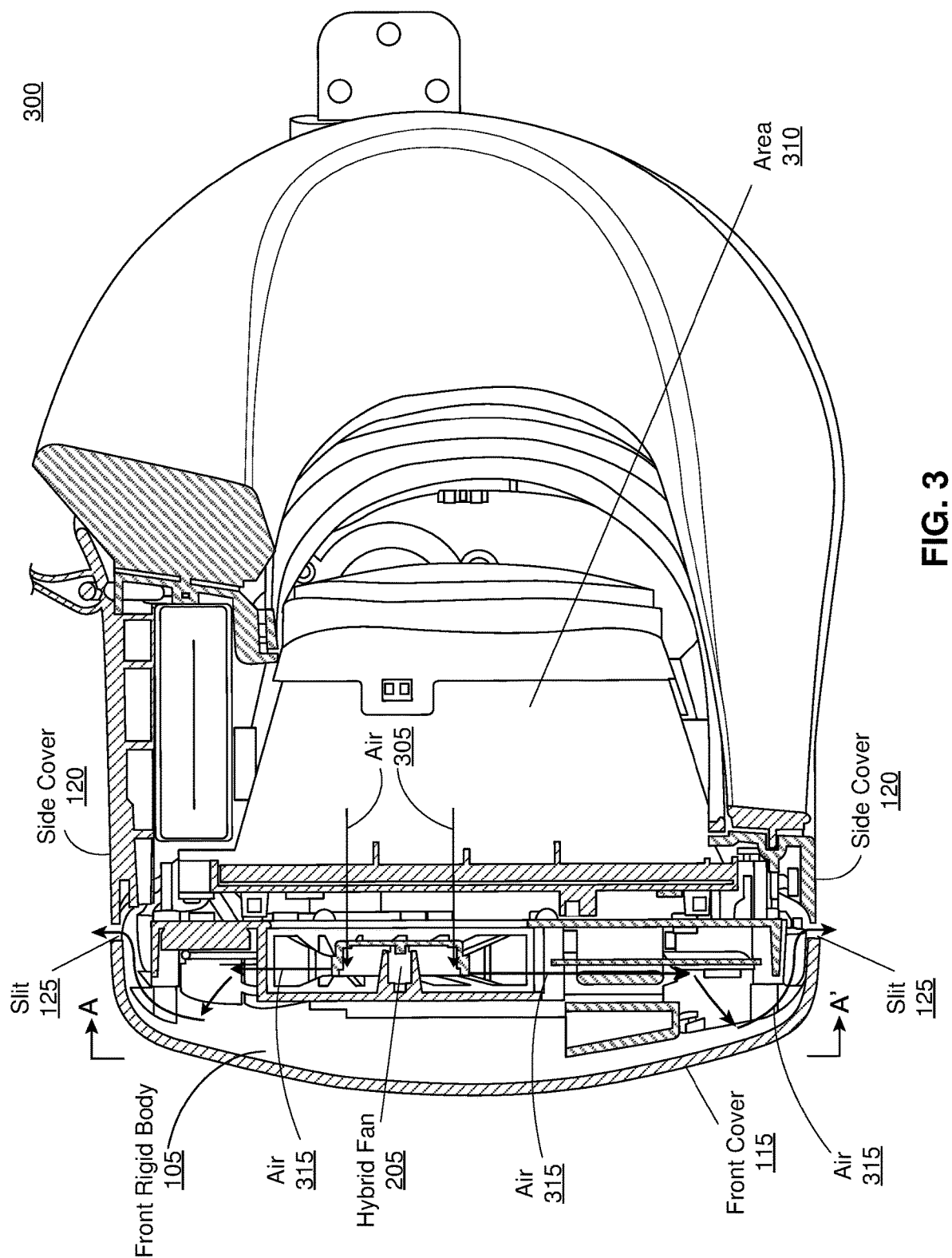
FIG. 3 is a cross-sectional view of the front rigid body of the HMD in FIG. 1 taken along line A-A' of FIG. 2B, in accordance with an embodiment.

FIG. 3 is a cross-sectional view 300 of the front rigid body 105 of the HMD 100 in FIG. 1 taken along line A-A' of FIG. 2B. In FIG. 3, flow of air within the HMD 100 is illustrated. As discussed above, the hybrid fan 205 pulls air 305 from a rear side of the front rigid body 105. The hybrid fan 205 pulls the air 305 from, e.g., an area 310 that includes a cavity between a face of a user wearing the HMD 100 and the front rigid body 105 to cool down temperature in the cavity. As shown in FIG. 3, the air 305 is sucked from the area 310 through the hybrid fan 205 and then exhausted as air 315 radially around a periphery of the hybrid fan 205. After that, the air 315 is pushed along at least a portion of an inner surface of the front cover 115 out of the front rigid body 105 through the slits 125. In some embodiments, the exhaust of the air 315 is restricted over a portion of a whole circle (360°) around the periphery of the hybrid fan 205. The restricted exhaust of the air 315 may serve to direct flow of the air 315 preferentially over thermally sensitive parts of the HMD 100, such as for cooling of the one or more electronic components of the PCB 210 including the CPU 230.

As discussed in conjunction with FIGS. 2A-2B, the heat pipe 215 (not visible in the cross-sectional view 300 in FIG. 3) partially surrounding a periphery of the hybrid fan 205 transfers heat and air away from the one or more electronic components of the PCB 210 including the CPU 230. The heat pipe 215 is connected to the metal frame 220 (not visible in the cross-sectional view 300 in FIG. 3) that acts as a sink for the heat transferred away from the one or more components of the PCB 210. The metal frame 220 spreads the heat, which helps discharging the heat out of the front rigid body 105, e.g., through the slits 125. Thus, the air 315 shown in FIG. 3 may include the air 305 sucked from the area 310 (i.e., from the rear side of the front rigid body 105) and the heat transferred away from the one or more electronic components of the PCB 210 by the heat pipe 215.

As discussed above in conjunction with FIG. 1 and further shown in FIG. 3, the front cover 115 is attached to the side cover 120 with the slit 125 between each outer edge of the front cover 115 and each outer edge of the side cover 120 to discharge the air 315 from the hybrid fan 205 and out of the front rigid body 105 and the HMD 100. As shown in FIG. 3, the air 315 flows at least partially along the inner surface of the front cover 115 and then out of the front rigid body 105 through the slits 125 formed between the front cover 115 and the side cover 120. By pulling the air 315 through the slits 125 out of the front rigid body 105, heat generated inside the HMD 100 by the one or more components of the PCB 210 and/or by the user's face is discharged out of the HMD 100.

Figure 4:
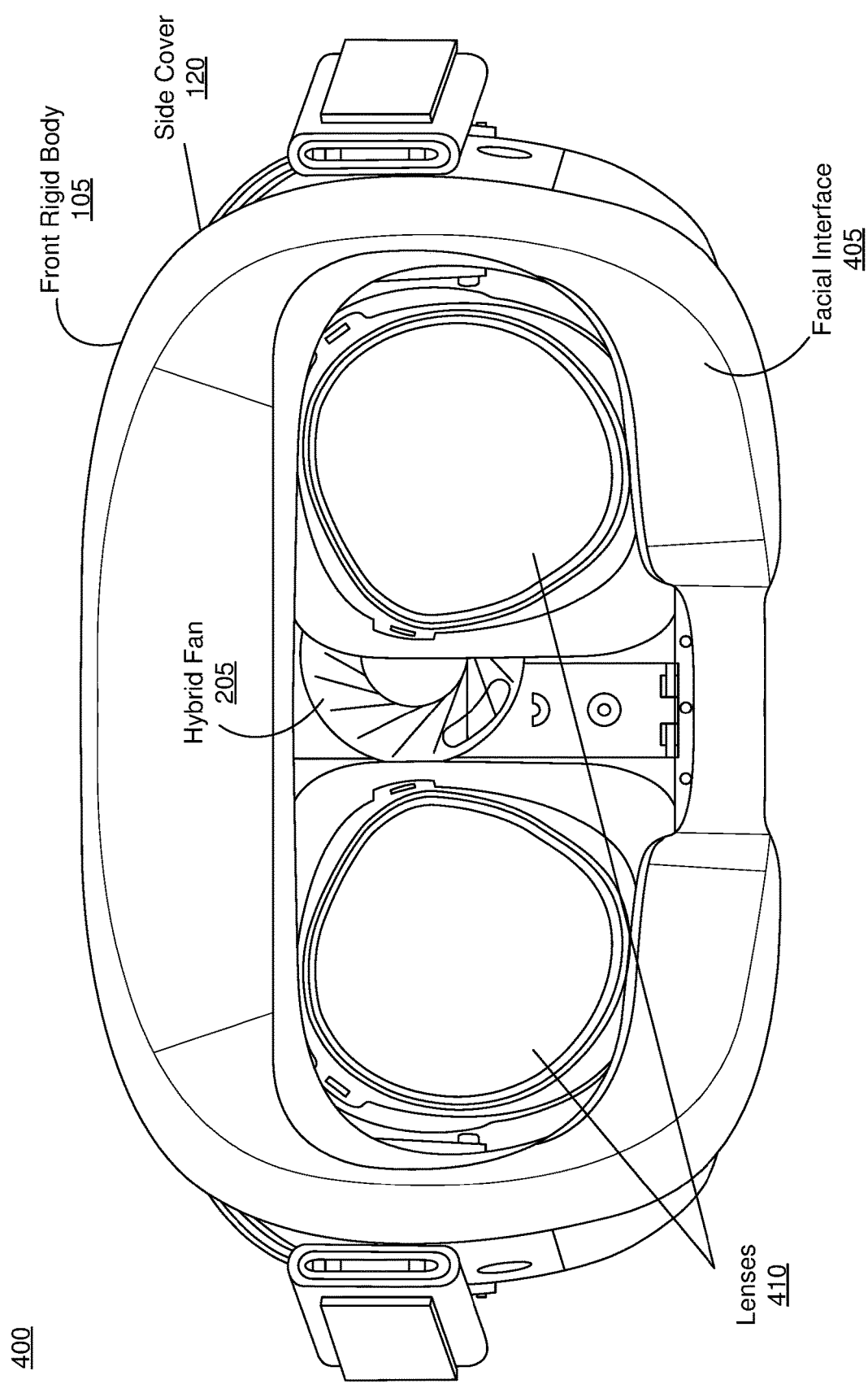
FIG. 4 is a rear view of the front rigid body of the HMD in FIG. 1, showing a view of a hybrid fan from a facial interface of the HMD, in accordance with an embodiment.

FIG. 4 is a rear view 400 of the front rigid body 105 of the HMD 100 in FIG. 1, showing a view of the hybrid fan 205 from a facial interface 405 of the HMD 100, in accordance with an embodiment. A user wearing the HMD 100 places a face on the facial interface 405. While wearing the HMD 100, the user generates heat on its face, i.e., in a cavity between the face of the user and a front side of the front rigid body 105.

As discussed above, the hybrid fan 205 pulls warm and moist air from a rear side of the front rigid body 105 to the front side of the front rigid body 105, i.e., from the facial interface 405 to the front side of the front rigid body 105. Therefore, the hybrid fan 205 transfers the warm air and heat away from the face of the user and/or from the facial cavity through the hybrid fan 205. After that, the hybrid fan 205 exhausts the air at the sides of the hybrid fan 205 and along at least a portion of the inner surface of the front cover 115 (not shown in FIG. 4) and through the slits 125 (not shown in FIG. 4) formed between the front cover 115 and the side cover 120 out of the front rigid body 105. Thus, in addition to cooling the one or more electronic components of the PCB 210 including the CPU 230, the hybrid fan 205 helps keep the user's face more comfortable and mitigates fogging of lenses 410. Heat from the one or more components of the PCB 210 including the CPU 230 is transferred by the heat pipe 215 (not shown in FIG. 4) along at least a portion of the inner surface of the front cover 115 and through the slits 125 out of the front rigid body 105, as discussed in more detail in conjunction with FIG. 3.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted display (HMD) comprising:
   a fan having a center axis extending from a rear side of the HMD to a front side of the HMD, the fan configured to pull air from a rear side of the HMD;
   at least one processor separated from the fan, the at least one processor generating heat during operation of the HMD;
   a heat pipe at least partially surrounding a periphery of the fan and transferring the heat away from the at least one processor; and
   a metal frame onto which a circuit board comprising the at least one processor is directly mounted, wherein the metal frame receives the heat from the heat pipe and dissipates the heat.

2. The HMD of claim 1, further comprising:
   a side cover enclosing the fan, the at least one processor and the heat pipe; and
   a front cover attached to the side cover with a slit between an outer edge of the front cover and an outer edge of the side cover to discharge the heat out of the HMD.

3. The HMD of claim 2, wherein the metal frame is enclosed within the side cover.

4. The HMD of claim 2, wherein the metal frame has edges shaped with contours that match an internal contour of the side cover to support the side cover.

5. The HMD of claim 1, wherein the air flows at least partially along an inner surface of a front cover of the HMD and out of the HMD through slits formed between a front cover and a side cover of the HMD.

6. The HMD of claim 1, wherein the fan is further configured to pull the air from a cavity between a face of a user and the HMD to cool down a temperature in the cavity.

7. The HMD of claim 1, wherein an end of the heat pipe is coupled to the at least one processor via a thermal interface material.

8. The HMD of claim 1, wherein the heat pipe is horseshoe shaped with a first member coupled to the at least one processor, a second member extending parallel to the first member and a third member connecting the first member and the second member.

9. The HMD of claim 1, wherein the heat pipe comprises a first member coupled to the at least one processor and a second member extending parallel to the first member.

10. The HMD of claim 1, wherein the heat pipe transfers the heat away from the at least one processor into the metal frame that acts as a heat sink.

11. The HMD of claim 1, wherein the fan is a hybrid fan that exhausts the air at sides of the fan after pulling the air from the rear side of the HMD.

12. The HMD of claim 1, wherein the fan is further configured to pull air from front slots located on the fan and exhausts the air at sides of the fan for cooling the at least one processor.

13. A head-mounted display (HMD) comprising:
    a fan having a center axis extending from a rear side of the HMD to a front side of the HMD, the fan configured to pull air from a rear side of the HMD;
    at least one processor separated from the fan, the at least one processor generating heat during operation of the HMD; and
    a metal frame onto which a circuit board comprising the at least one processor is directly mounted, wherein the metal frame receives the heat and dissipates the heat.

14. The HMD of claim 13, further comprising:
    a side cover enclosing the fan, the at least one processor and the heat pipe; and
    a front cover attached to the side cover with a slit between an outer edge of the front cover and an outer edge of the side cover to discharge the heat out of the HMD.

15. The HMD of claim 14, wherein the metal frame is enclosed within the side cover and has edges shaped with contours that match an internal contour of the side cover to support the side cover.

16. The HMD of claim 13, wherein the fan is further configured to pull the air from a cavity between a face of a user and the HMD to cool down a temperature in the cavity.

17. The HMD of claim 13, further comprising a heat pipe at least partially surrounding a periphery of the fan, the heat pipe configured to transfer the heat away from the at least one processor.

18. The HMD of claim 13, further comprising a heat pipe having an end coupled to the at least one processor, the heat pipe configured to transfer the heat away from the at least one processor.

19. The HMD of claim 13, further comprising a heat pipe that includes a first member coupled to the at least one processor and a second member extending parallel to the first member, the heat pipe configured to transfer the heat away from the at least one processor.

20. The HMD of claim 13, wherein the fan is a hybrid fan that exhausts the air at sides of the fan after pulling the air from the rear side of the HMD.

* * * * *

UNITED STATES PATENT AND TRADEMARK OFFICE
CERTIFICATE OF CORRECTION

PATENT NO. : 10,656,690 B2  
APPLICATION NO. : 16/454519  
DATED : May 19, 2020  
INVENTOR(S) : Boyd Drew Allin et al.

Page 1 of 1

It is certified that error appears in the above-identified patent and that said Letters Patent is hereby corrected as shown below:

On the Title Page

Item (56), Column 2, under "U.S. Patent Documents", Line 1, after "Stone" insert -- et al. --.

Signed and Sealed this  
Seventeenth Day of November, 2020

Andrei Iancu  
*Director of the United States Patent and Trademark Office*